(12) United States Patent
Ota et al.

(10) Patent No.: US 8,193,901 B2
(45) Date of Patent: Jun. 5, 2012

(54) REMOTE CONTROLLER, REMOTE CONTROL SYSTEM, AND METHOD FOR DISPLAYING DETAILED INFORMATION

(75) Inventors: Motoari Ota, Asaka (JP); Takeshi Misawa, Asaka (JP); Takeshi Miyashita, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1016 days.

(21) Appl. No.: 11/724,301

(22) Filed: Mar. 15, 2007

(65) Prior Publication Data

US 2007/0217650 A1 Sep. 20, 2007

(30) Foreign Application Priority Data

Mar. 20, 2006 (JP) .................................. 2006-077587

(51) Int. Cl.
*G05B 23/02* (2006.01)
(52) U.S. Cl. ......................... 340/3.71; 340/3.1; 348/143
(58) Field of Classification Search .................. 340/825, 340/825.57, 825.62, 825.69, 426.13–426.15, 340/1.1, 12.1, 12.15, 3.1, 3.71; 348/143
See application file for complete search history.

(56) References Cited

U.S. PATENT DOCUMENTS

| | | | | |
|---|---|---|---|---|
| 3,961,851 A | * | 6/1976 | Gerharz | 356/3.16 |
| 5,457,478 A | * | 10/1995 | Frank | 345/158 |
| 5,838,250 A | * | 11/1998 | Maekawa | 348/143 |
| 6,424,660 B2 | | 7/2002 | Jacobson, Jr. | |
| 6,646,676 B1 | | 11/2003 | DaGraca et al. | |
| 6,762,692 B1 | * | 7/2004 | Mingot et al. | 340/12.54 |
| 6,868,292 B2 | | 3/2005 | Ficco et al. | |
| 7,042,337 B2 | * | 5/2006 | Borders et al. | 340/286.07 |
| 7,068,306 B2 | * | 6/2006 | Pyle et al. | 348/211.9 |
| 7,177,633 B2 | * | 2/2007 | Ishiwatari | 455/418 |
| 7,379,664 B2 | * | 5/2008 | Marcus | 396/56 |
| 7,626,608 B2 | * | 12/2009 | Takeda et al. | 348/143 |
| 7,702,135 B2 | * | 4/2010 | Hill et al. | 382/107 |
| 2002/0010589 A1 | | 1/2002 | Nashida et al. | |
| 2004/0246098 A1 | * | 12/2004 | Denison et al. | 340/5.73 |

(Continued)

FOREIGN PATENT DOCUMENTS

JP 2000-076197 A 3/2000

(Continued)

OTHER PUBLICATIONS

Japanese Office Action dated Feb. 2, 2010 with English translation thereof.

(Continued)

*Primary Examiner* — Brian Zimmerman
*Assistant Examiner* — James Yang
(74) *Attorney, Agent, or Firm* — McGinn IP Law Group, PLLC

(57) ABSTRACT

The present invention relates to a technology which acquires information specific to a device by an image pickup element and remotely controls a desired device based on the acquired device-specific information. Particularly, the present invention relates to a technology which displays information for performing detailed remote control easily. In the present invention, it is intended to display information about manipulation of a desired device as needed and to facilitate remote manipulation of the device. As a result, according to an aspect of the present invention, since detailed information of a desired device can be selected to be viewed, detailed information of each of multiple devices can be easily identified by a single controller as needed.

20 Claims, 12 Drawing Sheets

U.S. PATENT DOCUMENTS

| | | | |
|---|---|---|---|
| 2005/0001024 A1 | 1/2005 | Kusaka et al. | |
| 2005/0035855 A1* | 2/2005 | Sarnowsky | 340/531 |
| 2005/0206513 A1* | 9/2005 | Fallon | 340/506 |
| 2007/0013775 A1* | 1/2007 | Shin | 348/114 |
| 2007/0070060 A1* | 3/2007 | Kagawa et al. | 345/418 |
| 2007/0214368 A1 | 9/2007 | Ota et al. | |
| 2007/0236327 A1 | 10/2007 | Miyashita et al. | |
| 2011/0199196 A1* | 8/2011 | Shin | 340/13.25 |

FOREIGN PATENT DOCUMENTS

| | | |
|---|---|---|
| JP | 2001-145179 | 5/2001 |
| JP | 2001-245364 | 9/2001 |
| JP | 2002-247045 | 8/2002 |
| JP | 2002-247666 | 8/2002 |
| JP | 2002-291072 | 10/2002 |
| JP | 2003-32509 | 1/2003 |
| JP | 2003-148740 | 5/2003 |
| JP | 2003-284168 | 10/2003 |
| JP | 2003-323440 | 11/2003 |
| JP | 2003-330953 | 11/2003 |
| JP | 2004-048524 | 2/2004 |
| JP | 2004-48524 | 2/2004 |
| JP | 2004-164602 | 6/2004 |
| JP | 2004-289505 | 10/2004 |
| JP | 2005-260507 | 9/2005 |
| JP | 2005-323220 | 11/2005 |
| JP | 2005-348213 | 12/2005 |
| JP | 2006-33718 | 2/2006 |

OTHER PUBLICATIONS

"Proposal of 'OPTO-NAVI' System, which is an information-appliance multi-purpose remote controller using a low power consumption ID-receiving CMOS image sensor having a function of reading a partial area at a high speed" (The Journal of the Institute of Image Information and Television Engineers vol. 59, No. 12, pp. 1830-1849 (2005)).

Proposal of 'OPTO-NAVI' System, which is an information-appliance multi-purpose remote controller using a low power consumption ID-receiving CMOS image sensor having a function of reading a partial area at a high speed (The Journal of the Institute of Image Information and Television Engineers vol. 59, No. 12, pp. 1830-1849 (2005)), filed on Mar. 15, 2007.

U.S. Office Action dated Mar. 26, 2010 in U.S. Appl. No. 11/715,462.

U.S. Office Action dated Jun. 22, 2010 in U.S. Appl. No. 11/723,927.

Office Action dated Aug. 6, 2010 in U.S. Appl. No. 11/715,462.

Japanese Office Action dated Oct. 12, 2010 with English translation thereof.

Koji Yamamoto et al., "Proposal of 'OPTO-NAVI' System, which is an information-appliance multi-purpose remote controller using a low power consumption ID-receiving CMOS image sensor having a function of reading a partial area at a high speed." The Journal of the Institute of Image Information and Television Engineers, vol. 59, No. 12, pp. 1830-1840, Sep. 2005.

Japanese Office Action dated Sep. 17, 2010 (with English-language translation).

* cited by examiner

FIG.2A

| DEVICE-SPECIFIC INFORMATION | DETAILED INFORMATION | DEVICE-SPECIFIC INFORMATION | DETAILED INFORMATION |

FIG.2B

| DEVICE-SPECIFIC INFORMATION | DETAILED INFORMATION | | DEVICE-SPECIFIC INFORMATION | DETAILED INFORMATION | |
|---|---|---|---|---|---|
| | HIGHER HIERARCHICAL LAYER | LOWER HIERARCHICAL LAYER | | HIGHER HIERARCHICAL LAYER | LOWER HIERARCHICAL LAYER |

EXAMPLE WHERE TV IS SELECTED

FIG.8
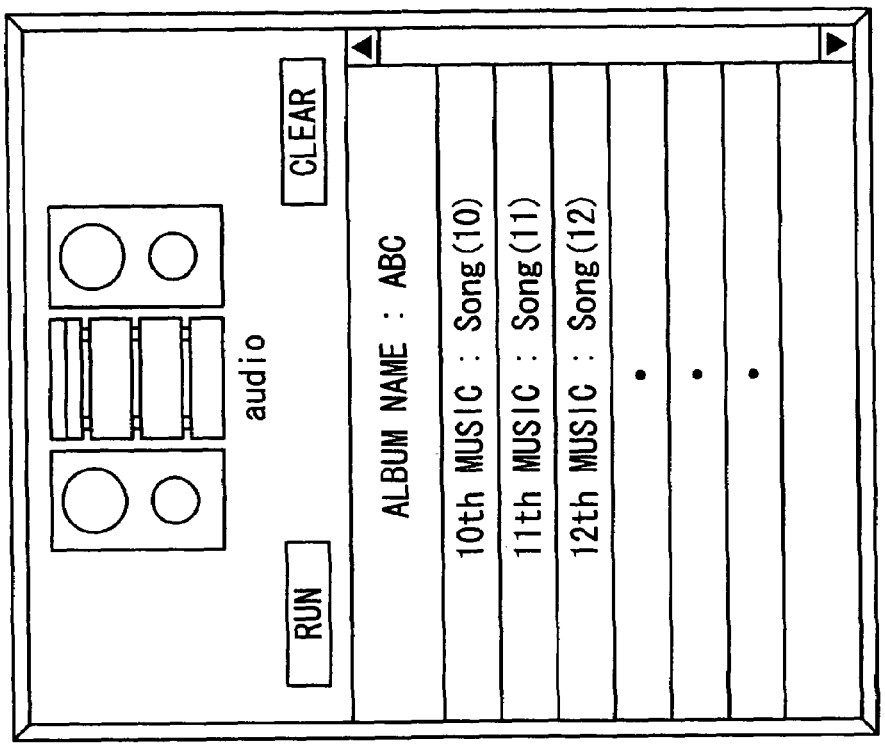
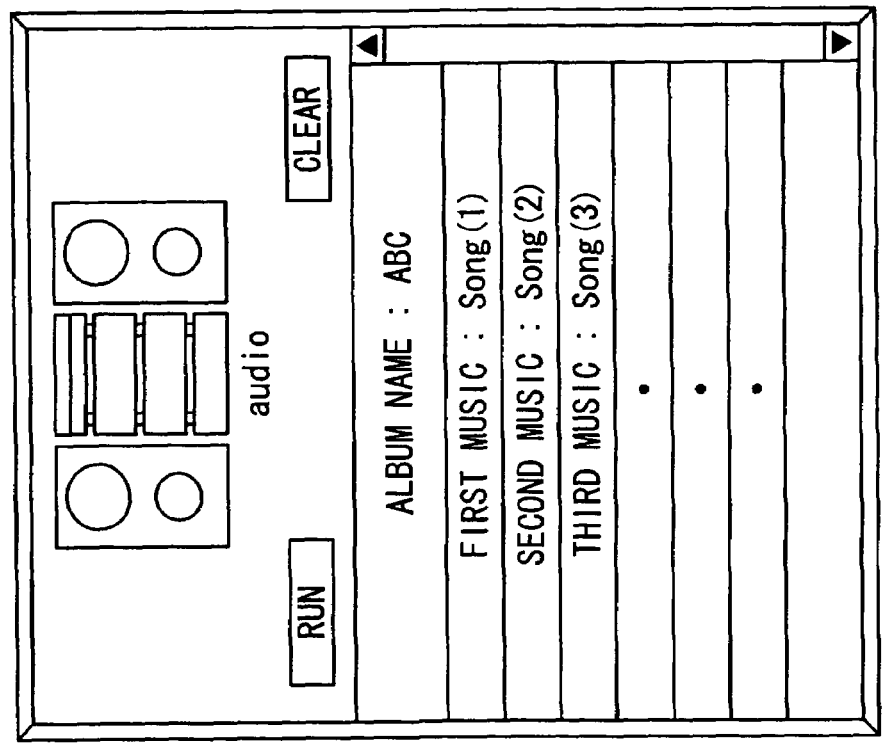
EXAMPLE WHERE AUDIO IS SELECTED DETAILED MODE SCREEN MAY BE SCROLLED EXAMPLE WHERE DVD IS SELECTED DETAILED MODE SCREEN MAY HAVE HIERARCHICAL STRUCTURE

REMOTE CONTROLLER, REMOTE CONTROL SYSTEM, AND METHOD FOR DISPLAYING DETAILED INFORMATION

BACKGROUND OF THE INVENTION

1. Field of the Invention

The present invention relates to a technology which acquires information specific to a device by an image pickup element and remotely controls a desired device based on the acquired device-specific information. Particularly, the present invention relates to a technology which displays information for performing detailed remote control easily.

2. Description of the Related Art

Recently, various technologies have been developed wherein a single controller controls a desired device in an easily and intuitively understood manner. For example, a custom image sensor installed in a mobile phone is used to receive an ID from a device while taking a normal image in real time, as described in "Proposal of 'OPTO-NAVI' System, which is an information-appliance multi-purpose remote controller using a low power consumption ID-receiving CMOS image sensor having a function of reading a partial area at a high speed" (The Journal of the Institute of Image Information and Television Engineers Vol. 59, No. 12, pp. 1830-1840 (2005)). Then, the received ID is superimposed on the taken background image and displayed on a display. A user can manipulate the target device and its ID on the display with visual recognition.

SUMMARY OF THE INVENTION

When the number of devices to be manipulated is increased, detailed operation instructions to the devices from a single controller are complicated, but the aforementioned document does not disclose a specific means for performing detailed manipulation of a desired device of a plurality of devices. The present invention is made in view of the above described problem, and intended to display information about manipulation of a desired device as needed and to facilitate remote manipulation of the device.

A remote controller according to the present invention comprises: an acquisition section which continuously acquires, by an image pickup element, an image whose object is a target device to be remotely controlled, device-specific information optically transmitted from the device, and detailed information about control of the device; a display section which superimposes the image and the device-specific information which are continuously acquired by the acquisition section to display the superimposed image; an instruction accepting section which accepts, from a user, instructions of selection of information specific to a desired device to be remotely controlled from among devices whose such specific information is acquired and selection of a desired control content with respect to the device whose specific information is selected; and a remote control section which transmits a remote control signal corresponding to the control content selected at the instruction accepting section to the device whose specific information is selected at the instruction accepting section, wherein the display section displays detailed information about control of the device whose specific information is selected according to the selection of the specific information at the instruction accepting section.

According to the present invention, since detailed information of a desired device can be selected to be viewed, detailed information of each of multiple devices can be easily identified by a single controller as needed.

Alternatively, the instruction accepting section may accept selection of desired detailed information from detailed information about control of the device displayed on the display section, and the remote control section may transmit a remote control signal corresponding to a control content defined by the detailed information selected at the instruction accepting section to the device whose specific information is selected at the instruction accepting section.

According to the present invention, since a remote control signal having a desired control content can be sent to a desired device based on detailed information from the desired device, detailed remote control of a plurality of devices can be very easily performed using a single controller.

In a case where detailed information has a hierarchical structure, the display section may display detailed information about control of a selected device for each hierarchical layer.

A remote control system according to the present invention comprises: a device which optically transmits specific information and detailed information about control of the device, an acquisition section which continuously acquires, by an image pickup element, an image whose object is the device, the device-specific information optically transmitted from the device, and the detailed information about control of the device; a display section which superimposes the image and the device-specific information which are continuously acquired by the acquisition section to display the superimposed image; an instruction accepting section which accepts, from a user, instructions of selection of information specific to a desired device to be remotely controlled from among devices whose such specific information is acquired and selection of a desired control content with respect to the device whose specific information is selected; and a remote control section which transmits a remote control signal corresponding to the control content selected at the instruction accepting section to the device whose specific information is selected at the instruction accepting section, wherein the display section displays detailed information about control of the device whose specific information is selected according to the selection of the specific information at the instruction accepting section.

A method for displaying detailed information according to the present invention comprises the steps of: continuously acquiring, by an image pickup element, an image whose object is a target device to be remotely controlled, device-specific information optically transmitted from the device, and detailed information about control of the device; accepting, from a user, an instruction of selection of information specific to a desired device from among devices whose such specific information is acquired; and displaying detailed information about control of the device whose specific information selected according to the selection of the specific information.

ADVANTAGES OF THE INVENTION

According to the present invention, since detailed information of a desired device can be selected to be viewed, detailed information of each of multiple devices can be easily identified by a single controller as needed.

According to the present invention, since a remote control signal having a desired control content can be sent to a desired device based on detailed information from the desired device, detailed remote control of a plurality of devices can be easily performed using a single controller.

BRIEF DESCRIPTION OF THE DRAWINGS

FIGS. 2A and 2B are diagrams for illustrating a concept of device-specific information and detailed information transmitted from a device;

FIG. 8 is a diagram which shows an appearance in which desired detailed information is selected from detailed information received from a device (audio), and detailed information of a lower hierarchical layer of the selected detailed information is displayed;

DETAILED DESCRIPTION OF THE PREFERRED EMBODIMENTS

Figure 1:
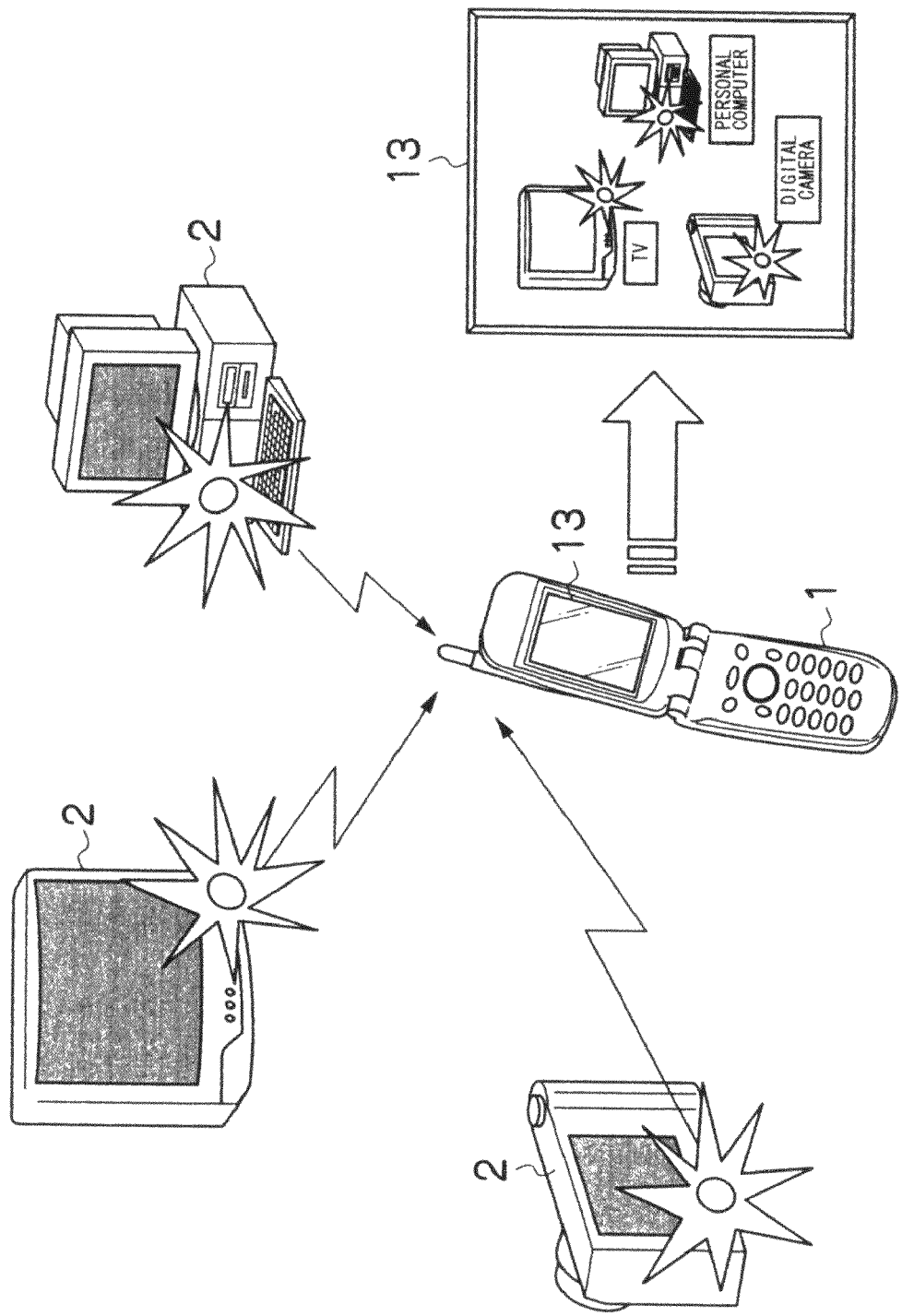
FIG. 1 is a schematic block diagram of a remote control system according to a first embodiment.

FIG. 1 is a schematic block diagram of a remote control system according to a first preferred embodiment of the present invention. The system comprises a remote controller 1, and a number of devices 2 such as an audio visual device, a personal computer, and a cocking appliance controlled by the remote controller 1. The audio visual device may include a television, a video, a stereo, or the like. The remote controller 1 connects to each device 2 through an external network such as a mobile communication network or the Internet or a local area network (LAN).

When all operations of the device 2 is ready to remotely controlled (for example, a main power is on), the device 2 superimposes device-specific information specific to the device 2 itself (such as an identification number, an ID, a serial number, a manufacturer number, a type number, a model, an address on an external network, and any other information specific to the device 2) with a low-frequency pilot signal indicating oneself's position from which information is transmitted, and continuously transmits the device-specific information as an optical signal such as an infrared signal.

As shown in FIGS. 2A and 2B, in addition to the device-specific information, the device 2 further superimposes detailed information with the low-frequency pilot signal and continuously transmits the detailed information. As used herein, detailed information refers to detailed information about control of operation of a device (for example, a selection, play, and stop of music in an audio player).

FIG. 2A illustrates an aspect in which device-specific information and detailed information are alternately and repeatedly transmitted in a simple manner. FIG. 2B illustrates an aspect in which device-specific information and detailed information having hierarchical structure composed of detailed information of a higher layer and detailed information of a lower layer are alternately and repeatedly transmitted. The hierarchical structure of detailed information will be described later.

Additionally, the device 2 receives a remote control signal (transmitted as an optical signal such as an infrared signal, or an electrical signal such as of a Bluetooth or a wireless LAN) from the remote controller 1.

Figure 3:
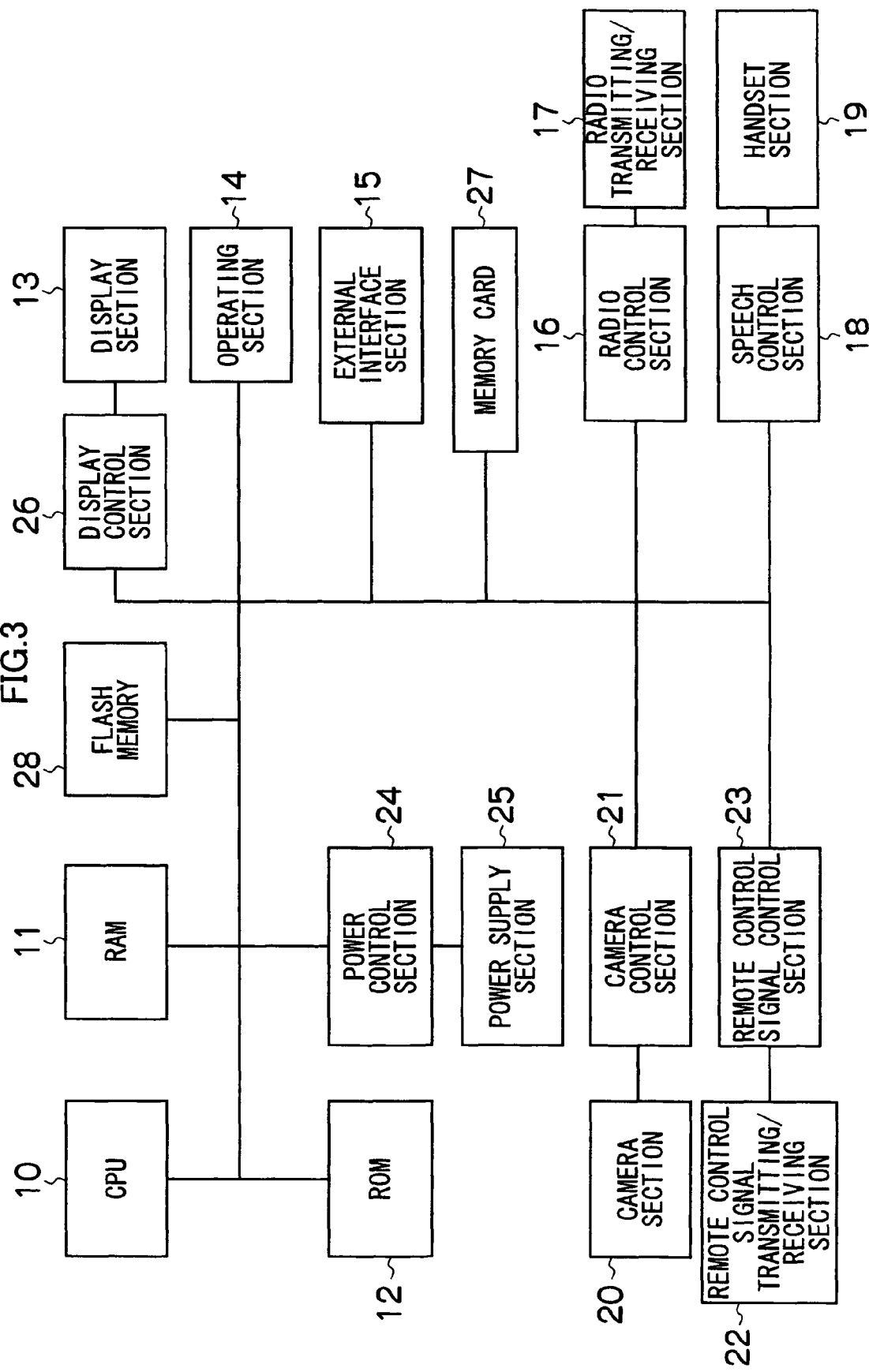
FIG. 3 is a block diagram of a remote controller.

FIG. 3 is a functional block diagram of the remote controller 1 according to a preferred embodiment of the present invention. The remote controller 1 comprises a camera section 20 which includes an imaging lens, a solid-state image sensor such as a CMOS or a CCD, an analog front end circuit for processing an analog image read from the solid-state image sensor by the driver to turn it into a digital signal, and a signal processing circuit such as a DSP (Digital Signal Processor) for processing a digital image signal from the analog front end circuit, and a camera control section 21 which includes a one-chip microcomputer and the like and controls an image taking operation of the camera section 20.

The remote controller 1 further comprises a display control section 26 which performs display control of the display section 13 according to an input operation on the operating section 14 having a numeric keypad, an arrow key, and the like, various kinds of manipulation signals received by a remote control signal transmitting/receiving section 22 from outside, an image or device-specific information acquired by the camera section 20, and so on.

The remote controller 1 further comprises a CPU 10 which controls over operational control of each part, a ROM 12 which stores various data and programs, and a RAM 11 which stores various data required for processing by the CPU 10.

Particularly, the ROM 12 stores, for each of multiple devices 2, a control program for the CPU 10 to control a remote control signal control section 23 or a radio control section 16 to transmit a remote control signal on which a control code for a device 2 corresponding to an operation on the operating section 14 is superimposed, and a remote control GUI which visually displays a relationship between an operation of respective parts by the operating section 14 and a control code superimposed corresponding to the operation.

For example, an optical double zoom lens is used as the image-taking lens, and the optical zoom magnification is changed by a motor driver forward and backward driving the image-taking lens to the telephotographic (tele) side or the wide-angle (wide) side in accordance with a magnification change operation inputted from the operation section 14. The magnification of the image-taking lens is not limited to the above. An aperture is provided for the image-taking lens. An appropriate amount of exposure is obtained by controlling the aperture via the motor driver.

When the photographing mode is set by the operation section 14, the CPU 10 displays a motion picture (live images) on the display section 13 to enable confirmation of the image-taking angle of field. That is, the solid-state image sensor converts a light of a subject which is incident through the image-taking lens and is formed on the light-receiving surface of the image sensor to an amount of signal charge corresponding to the amount of the light. The signal charges of respective pixels accumulated in this way are sequentially and individually read by the driver as voltage signals (image signals) corresponding to the signal charges, based on a driving pulse given by a timing generator in accordance with a direction from the CPU 10 and converted to digital signals in the analog front-end circuit, and each of them is added to the signal processing circuit.

The signal processing circuit includes a gain adjustment circuit and an A/D converter. It is an image processing device which includes a brightness/color difference signal generation circuit, a gamma correction circuit, a sharpness correction circuit, a contrast correction circuit, a white balance correction circuit, an outline processing section for performing imaging processing including outline correction for a taken image, a noise reduction processing section for performing noise reduction processing of an image and the like, and it processes an image signal in accordance with a command from the CPU 10.

The image data inputted into the signal processing circuit is converted to a brightness signal (Y signal) and a color difference signal (Cr/Cb signal), and the signals are stored in the VRAM after predetermined processings such as gamma correction is performed therefor.

When the monitor output of a taken image to the display section 13 is performed, a Y/C signal is read from the VRAM and sent to a display control section 26. The display control section 26 converts the inputted Y/C signal to a signal of a predetermined method for display (for example, a compound color picture signal of an NTSC method) and outputs it to the display section 13.

The Y/C signals of respective frames which have been processed at a predetermined frame rate are written in an A area and a B area of the VRAM alternatively, and a written Y/C signal is read not from the area in which a Y/C signal is being written but from the other area, between the A and B areas. By the Y/C signals in the VRAM being periodically overwritten, and picture signals generated from the Y/C signals being provided for the display section 13, the picture being taken is displayed on the display section 13 in real time. The user can confirm the image-taking angle of field by the picture (live images) displayed on the display section 13.

Here, when a photographing key provided on the operation section 14 is pressed, a photographing operation for storage is started. Image data acquired in response to the pressing of the photographing key is converted to a brightness/color difference signal (Y/C signal) in the signal processing circuit, and it is stored in the RAM 11 after predetermined processings such as gamma correction are performed therefor.

The Y/C signal stored in the RAM 11 is compressed in accordance with a predetermined format by a compression/expansion processing circuit and then stored in a memory card 27 as an image file in a predetermined format such as an Exif file. The image file can also be stored in a flash memory 28.

When the reproduction mode is set by the operation section 14, the compressed data of the final image file stored in the flash memory 28 (a file stored last) is read. When the file stored last is a still image file, the read compressed image data is expanded to an uncompressed Y/C signal via the compression/expansion processing circuit and stored in the VRAM. The Y/C signal stored in the VRAM is added to the display control section 26. The display control section 26 creates a compound RGB color picture signal of the NTSC method from the inputted Y/C signal and outputs it to the display section 13. Thereby, the frame image of the last frame stored in the memory card 27 is displayed on the display section 13.

After that, when the right key of a cross key provided on the operation section 14 is pressed, frame advancing is performed in the forward direction, and when the left key of the cross key is pressed, frame returning is performed in the opposite direction. Then, an image file at the frame position set by the frame advancing or returning is read from the memory card 27, and a frame image is reproduced on the display section 13 similarly as described above. If frame advancing is performed in the forward direction when the frame image of the last frame is displayed, the image file of the first frame stored in the memory card 27 is read, and the frame image of the first frame is reproduced on the display section 13.

The number of pixels of an image file to be stored is, for example, any of 2832×2128 (6 M), 2048×1536 (3 M), 1280×960 (1 M) and 640×480 (VGA), and the amount of data of a taken image (the file size) changes according to the combination of the stored image quality and the number of stored pixels.

The remote controller 1 may comprise a mobile phone having a camera, or a digital camera, for example, as described in the aforementioned document. However, in the present embodiment, a block for recording and storing an image (such as a memory card 27 and a flash memory 28) is not necessarily required.

The remote control signal transmitting/receiving section 22 includes a light receiving element. Although the camera section 20 and the remote control signal transmitting/receiving section 22 are shown separately in FIG. 3, the light receiving element is in common with the solid-state image sensor of the camera 20. Therefore, when the camera section 20 takes an image of a device 2 as an object, device-specific information and detailed information optically transmitted from the device 2 can be acquired along with the image.

The remote control signal control section 23 converts device-specific information superimposed on an optical signal that has entered from the external device 2 into the remote control signal control section 22 to digital data, and outputs it to the CPU 10.

A table which defines a control code specific to the device 2 identified with the device-specific information is read from the ROM 12 into the RAM 11 by the CPU 10 according to the device-specific information inputted from the remote signal control section 23. Then, according to desired device-specific information on the display section 13 which is specified by operation of the operating section 14, a control code for the device 2 identified with the specified device-specific information is read from the RAM 11 and sent to the remote control signal control section 23.

The remote control signal receiving/transmitting section 22 comprises an optical signal transmitting device including a light-emitting diode, an infrared LED, or the like. The remote control signal control section 23 transmits an optical signal on which a control code and other data indicated by the CPU 10 are superimposed to a specified device 2. By transmitting the optical control signal from the remote controller 1 to the specified device 2 in this way, remote manipulation of the device 2 is allowed.

In addition, the remote controller 1 comprises a radio transmitting/receiving section 17 which transmits/receives a radio signal such as of mobile communication radio wave, IrDA, Bluetooth, wireless LAN, or Wireless USB to/from a device 2, the radio control section 16 which converts a received radio signal to data to transmit it to the CPU 10 and superimposes a remote control signal indicated by the CPU 10 on a radio signal, and an external interface section 15 which communicates with various types of consumer device 2 such as a personal computer and a printer in accordance with a standard such as USB.

The CPU 10 may read a control code for a specific device 2 corresponding to an operation on the operating section 14 from the RAM 11 and send it to the radio control section 16.

The radio control section 16 transmits a radio signal on which a control code and other data inputted from the CPU 10 are superimposed to the device 2. This radio signal arrives at the device 2 through a LAN or an external network. Upon receiving the control code, the device 2 performs operation according to the control code. By transmitting the radio signal from the remote controller 1 to the device 2 in this way, remote manipulation of the specified device 2 by the operating section 14 is also allowed.

The remote controller 1 comprises a handset section 19 which includes a loudspeaker device such as a speaker that outputs a speech and a receiving device such as a microphone that receives and converts the speech into an electrical signal, and a speech control section 18 which controls contents of speech of the loudspeaker device. The speech control section 18 has a capability of recognizing a specific speech pattern specified by the CPU 10 from a speech signal inputted from the handset section 19.

The CPU 10 may read a control code for a specified device 2 corresponding to the speech received by the handset section 19 from the RAM 11 and send the control code to the remote control signal control section 23 or the radio control section 16. Thus, a control code transmitted as an optical signal or a radio signal to a specific device 2 is specified by not only an input operation on the operating section 14 but also a speech input.

In addition, the CPU 10 selects either remote control signal transmitting/receiving section 22 or the radio transmitting/receiving section 17 to transmit a control code therefrom according to an input operation on the operating section 14 or a speech to the handset section 19. When the remote controller 1 is in front of the target device 2 to be controlled, a control code can be transmitted from the remote control signal transmitting/receiving section 22. Otherwise, a user instructs the CPU 10 to transmit the control code from the radio transmitting/receiving section 17 through an input operation on the operating section 14 or a speech to the handset section 19. The CPU 10 controls the radio transmitting/receiving section 17 to transmit the control code therefrom according to this instruction.

Figure 4:
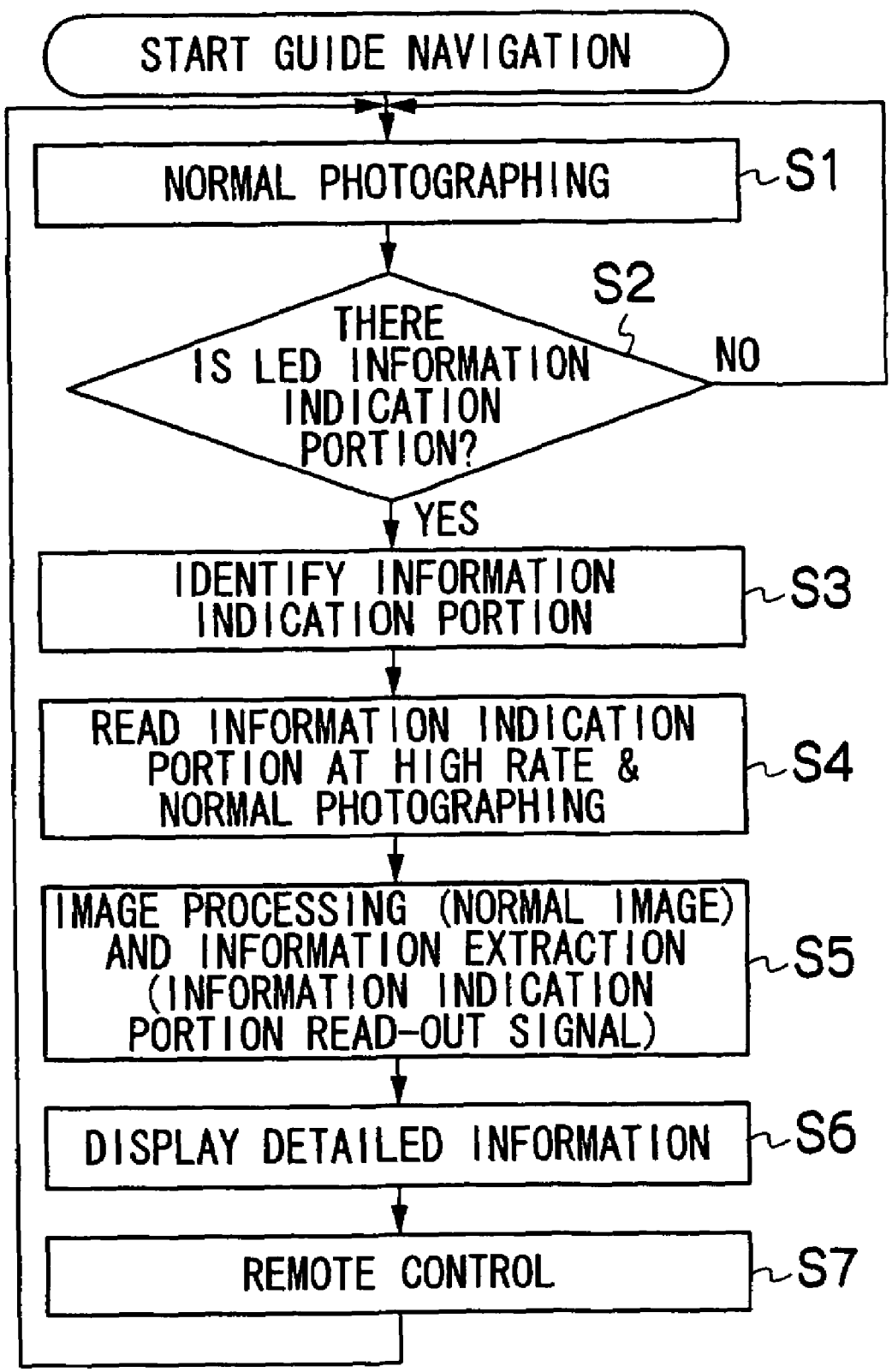
FIG. 4 is a flowchart which illustrates a flow of a guide navigation mode process.

FIG. 4 is a flowchart which illustrates a flow of a guide navigation mode process performed by the remote controller 1.

Firstly, in S1, the CPU 10 instructs the camera control section 21 to start a still image acquisition according to an image taking instruction inputted to the operating section 14 or the handset section 19. The camera control section 21 controls the camera section 20 to acquire a still image and stores it in the RAM 11.

In S2, the CPU 10 determines whether or not at least one pilot signal is detected from the image acquired by the camera section 20. When it is determined that at least one pilot signal is detected, the process proceeds to S3, and, when it is determined that no pilot signal is detected, the process returns to S1.

In S3, the CPU 10 identifies a position from which information is transmitted based on a position where the pilot signal is detected.

In S4, the CPU 10 performs a still image acquisition operation with respect to a portion corresponding to the information transmission position at a high frame rate, and performs a still image acquisition operation with respect to the other portion at a low frame rate again.

In S5, the CPU 10 displays the acquired still image on the display section 13 as through display and extracts superimposed information (both of device-specific information and detailed information).

In S6, the CPU 10 performs a process for displaying detailed information as described later.

In S7, the CPU 10 transmits a remote control signal containing a desired control code selected by the operating section 14 to a desired device 2 whose device-specific information is selected on the display section 13 by the operating section 14.

Figure 5:
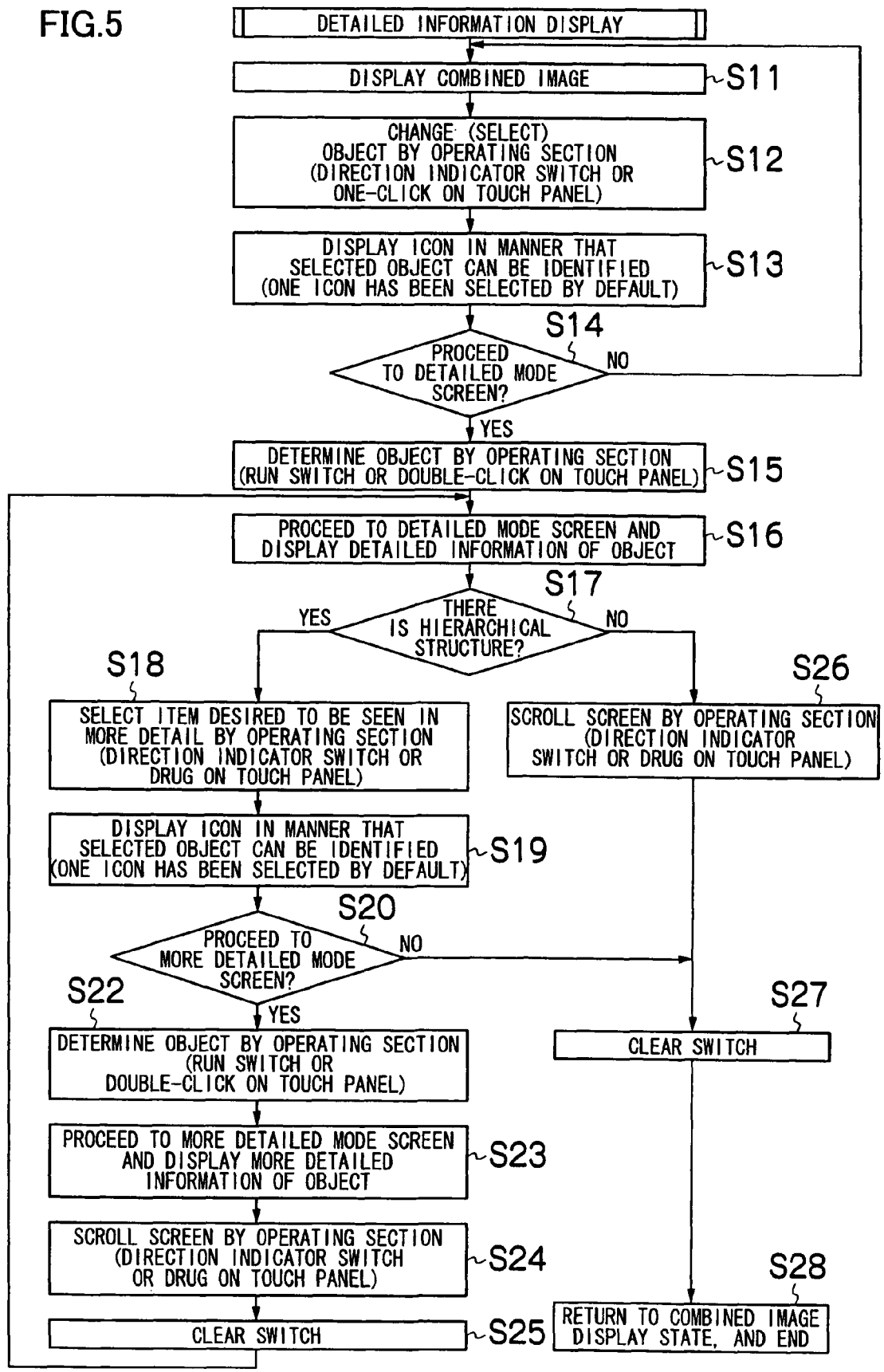
FIG. 5 is a flowchart which illustrates a flow of a process for displaying detailed information display process.

FIG. 5 is a flowchart which illustrates a flow of the process for displaying detailed information display process.

In S11, the CPU 10 combines extracted device-specific information and an icon of a device 2 corresponding thereto with a still image so as to display the information and icon near an information transmission position of each device 2 in the still image on the display section 13.

In S12, the CPU 10 allows the operating section 14 to select one of device-specific information of devices 2 on the display section 13. An example of an operation for specifying device-specific information is to click an icon of a selected desired device 2.

In S13, the CPU 10 highlights the device-specific information of the selected desired device 2 by blinking it, making it translucent, highlight it, drawing a box around it or the like.

Figure 6:
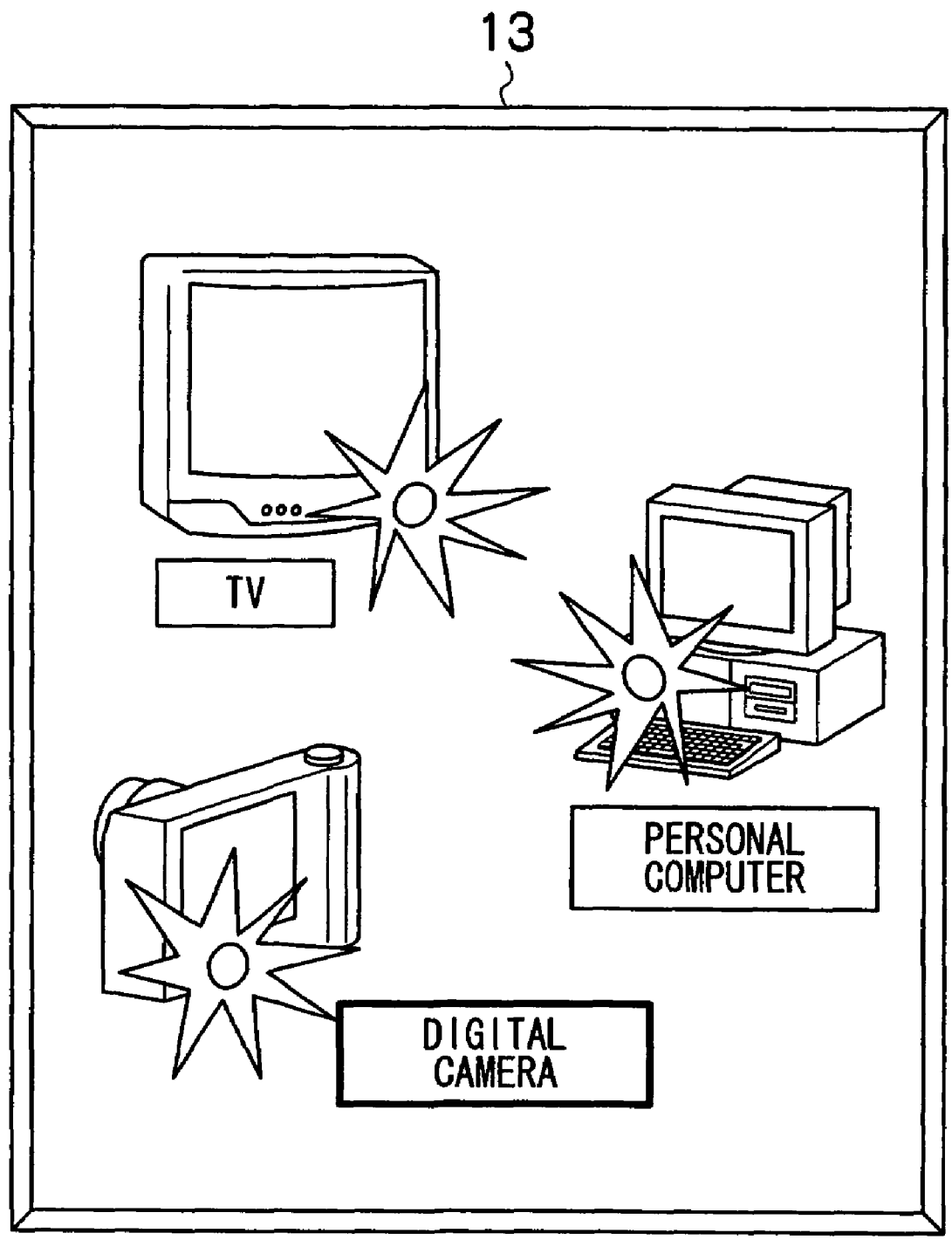
FIG. 6 is a diagram which shows an appearance in which information specific to a selected device is highlighted.

FIG. 6 shows an appearance in which a box is drawn around device-specific information of a selected device 2 as an example of highlighting.

In S14, the CPU 10 allows the operating section 14 to specify whether or not to start "detailed mode" in which detailed information of the selected desired device 2 is displayed. An example of an operation for specifying the start of the "detailed mode" is to press a "Run" switch displayed near the device-specific information of the selected desired device 2, or to double-click the icon of the selected desired device 2.

In S15, if a device 2 whose "detailed mode" to be started has been specified, the CPU 10 identifies such a device 2.

In S16, the "detailed mode" is started. Particularly, the through display of a still image is stopped, detailed information received from a selected device 2, a box around the detailed information, an icon of the device 2, and the like are displayed on the display section 13.

Figure 7:
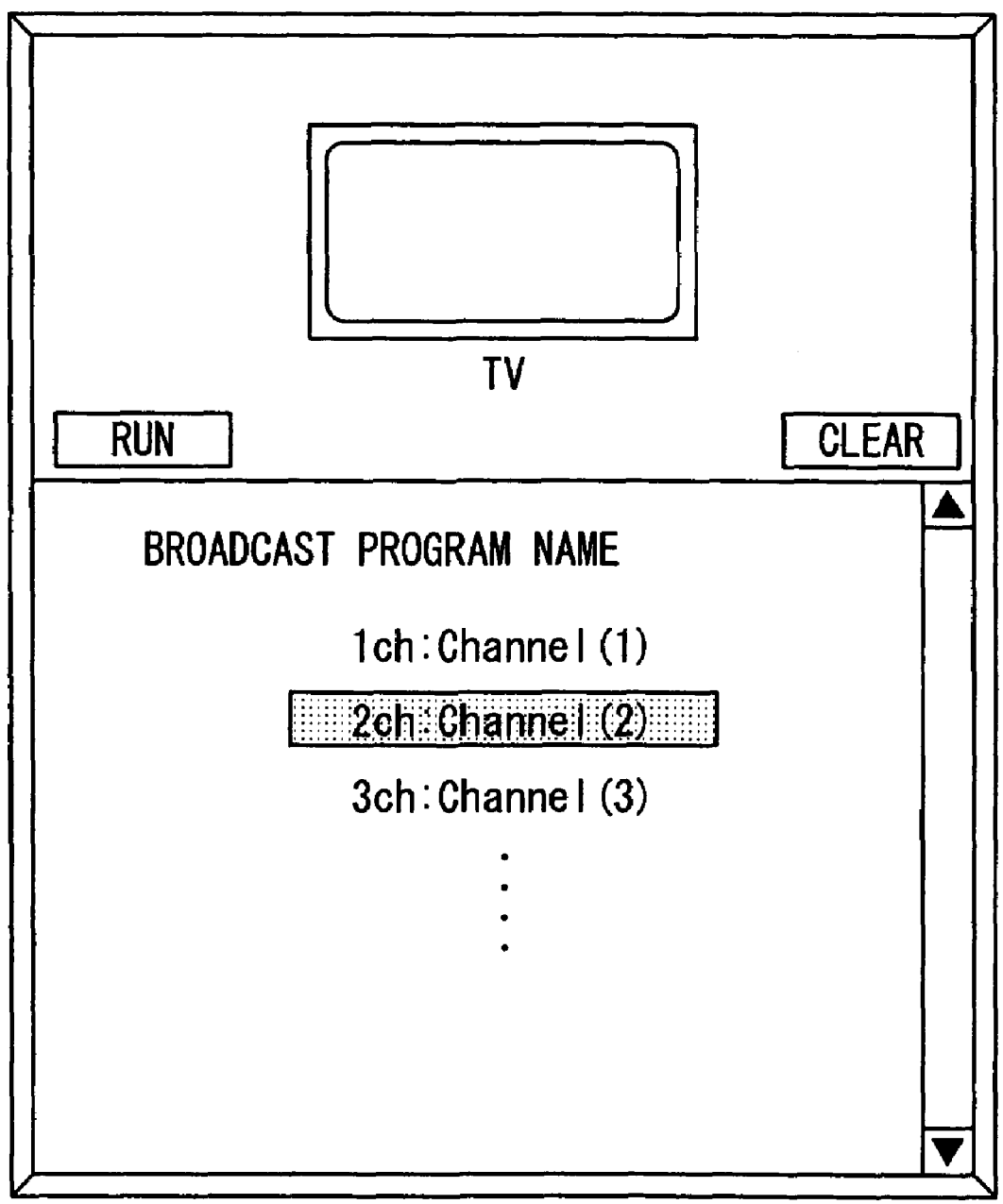
FIG. 7 is a diagram which shows an appearance in which detailed information received from a device (TV)

FIG. 7 shows an appearance in which a channel name of each broadcasting channel is displayed as detailed information received from a "TV (television receiver)" which is one type of device 2.

FIG. 8 shows an appearance in which names of an album and music to be played are displayed as detailed information received from an "audio (audio device)" which is one type of device 2. As shown in FIG. 8, if a list of detailed information (music names) does not fit into the display section 13 as a whole, a part of the detailed information may be scrolled to be displayed sequentially according to an operation such as pressing an arrow button on a touch panel or dragging on the screen.

In S17, whether or not detailed information received from a selected device 2 has a hierarchical structure is determined. When it has a hierarchical structure, the process proceeds to S18, and, when it has no hierarchical structure, the process proceeds to S26. The device 2 allows the remote controller 1 to identify a hierarchical structure by superimposing a header for identifying hierarchy of detailed information.

In S18, detailed information whose lower hierarchical structure is to be displayed is allowed to be selected from the displayed detailed information. An example of an operation for specifying such detailed information is to click an item of detailed information.

In S19, the selected detailed information is highlighted. In FIG. 7, it is shown that "2ch: Channel (2)" is selected as desired detailed information and highlighted.

In S20, whether change to a screen which displays detailed information of a lower hierarchical layer of the selected detailed information will be performed or not is allowed to be selected. When display of detailed information of the lower hierarchical layer is selected, the process proceeds to S22, and, when it is not selected, the process proceeds to S27.

In S22, if a device 2 whose "detailed mode" with respect lower detailed information to be started has been specified by pressing a "Run" switch, double-clicking an item of detailed information, or the like, the CPU 10 identifies such a device 2.

In S23, detailed information of a lower hierarchical layer of specified detailed information is displayed.

Figure 9:
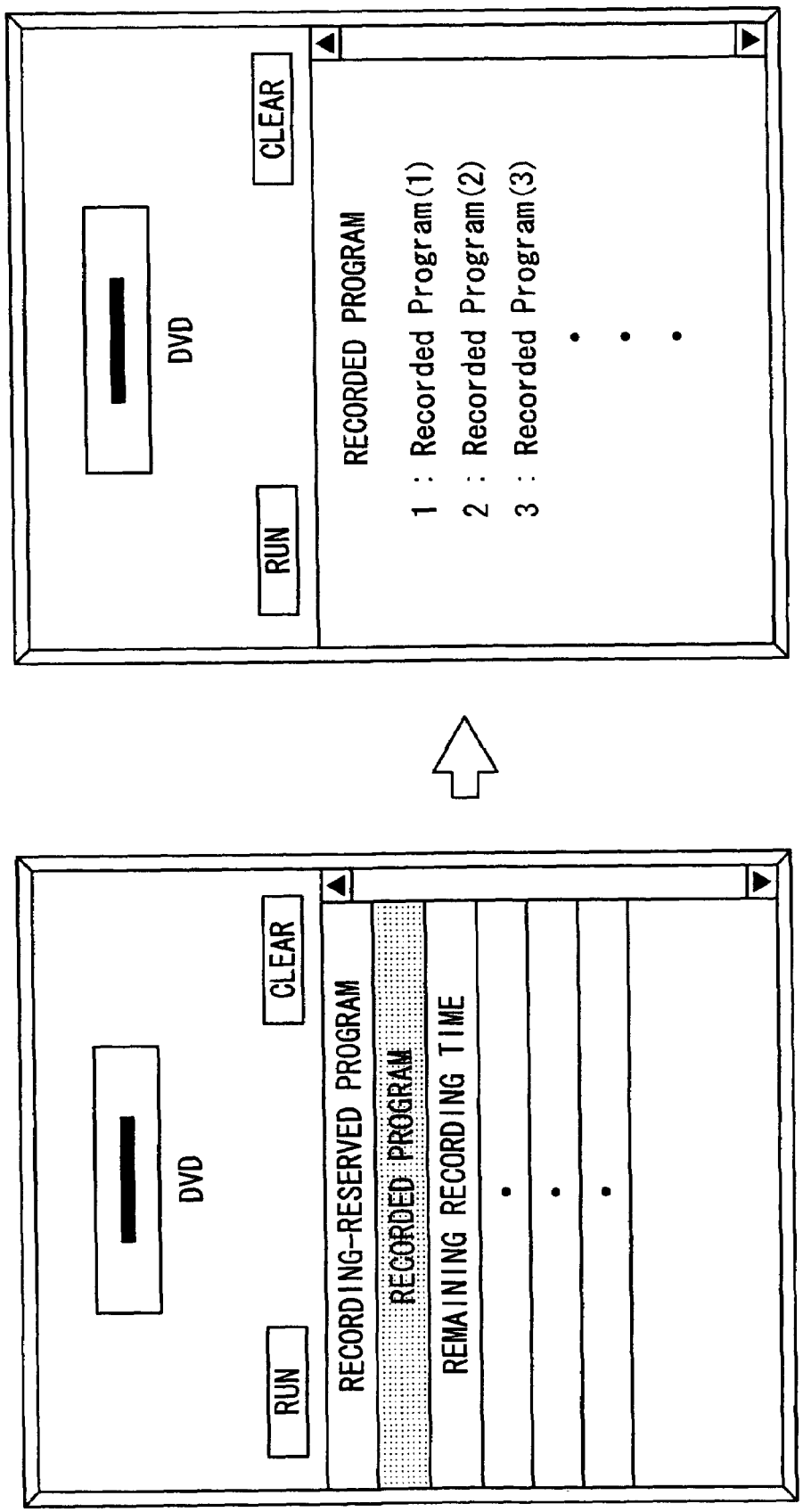
FIG. 9 is a diagram which shows an appearance in which desired detailed information is selected from detailed information received from a device (DVD player), and detailed information of a lower hierarchical layer of the selected detailed information is displayed.

In FIG. 9, detailed information of a lower hierarchical layer of "Recorded programs" is selected to be displayed from detailed information from a "DVD" which is one type of device 2, and accordingly, a list of recorded programs which is the detailed information of the lower hierarchical layer is displayed as "1: recorded program (1)", "2: recorded program (2)", "3: recorded program (3)" and so on.

In S24, the detailed information is scrolled to be displayed according to an screen scroll operation.

In S25, upon acceptance of a "Clear" switch operation, the display of the lower detailed information is terminated, and the process returns to S16 to switch it to the display of the upper detailed information. Alternatively, in S25, the process may return to S16 when the "Clear" switch is clicked once, and return to S11 when the "Clear" switch is pressed for a long time.

In S26, detailed information is scrolled to be displayed according to an screen scroll operation. In S27, an operation of the "Clear" switch is accepted. In S28, upon acceptance of the "Clear" switch operation, the display of the detailed information is terminated and switched to the display of an image which combines live images and device-specific information as in S11. Then, the process proceeds to S7 of the guide navigation process.

As described above, according to the present embodiment, since detailed information of a desired device 2 can be selected to be viewed, detailed information of each of multiple devices can be easily identified by a single controller as needed.

Second Embodiment

Figure 10:
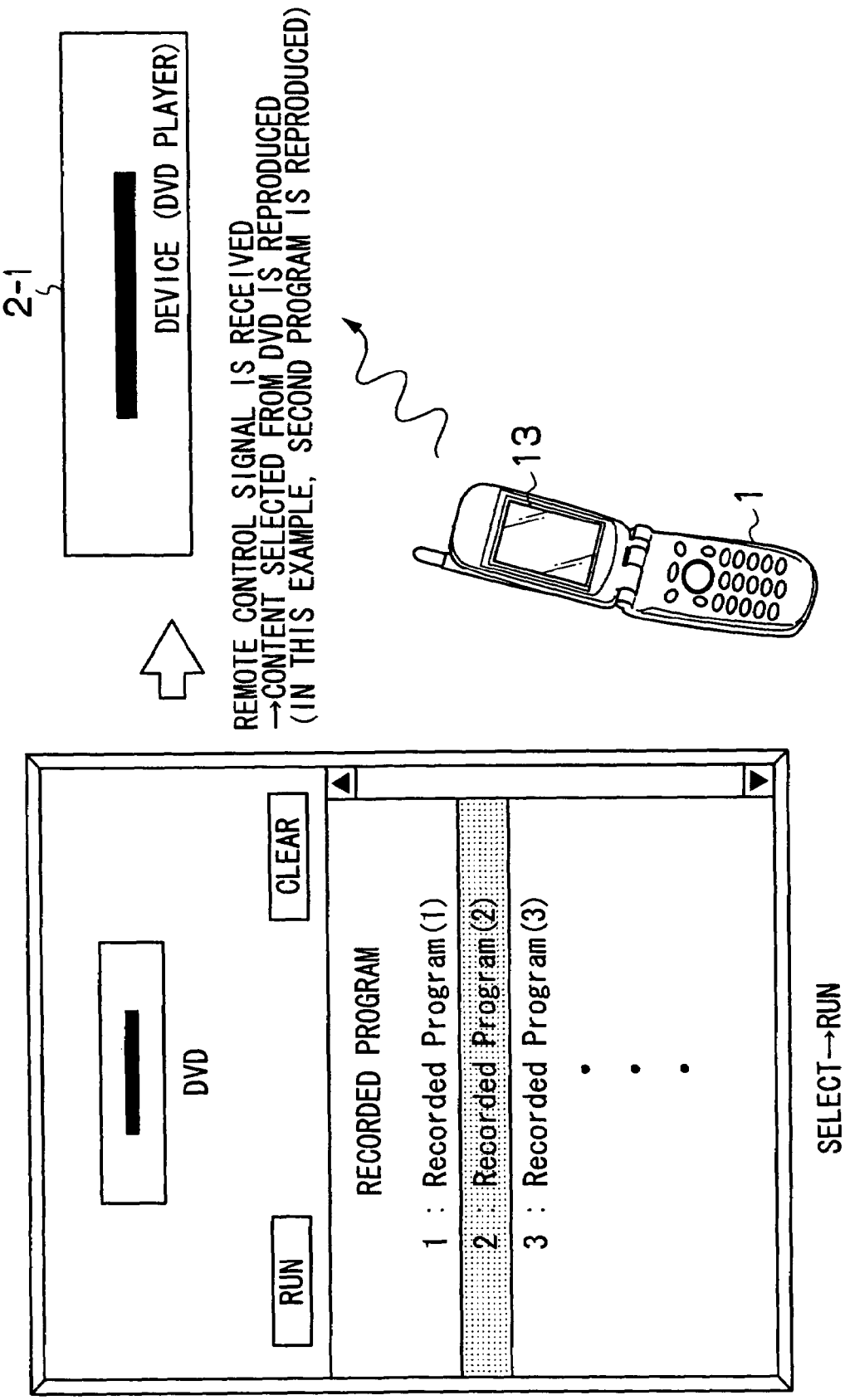
FIG. 10 is a schematic block diagram of a remote control system according to a second embodiment.

FIG. 10 is a schematic block diagram of a remote control system according to a second preferred embodiment of the present invention. This system comprises a remote controller 1, and a DVD player which is one type of device 2 controlled by the remote controller 1. The remote controller 1 connects to the DVD player through an external network such as a mobile communication network or the Internet or a local area network (LAN).

In the present embodiment, the remote controller 1 specifies a desired remote control content based on detailed information received from the device 2, and sends a remote control signal containing the specified content to the device 2 through a wired or wireless connection.

Figure 11:
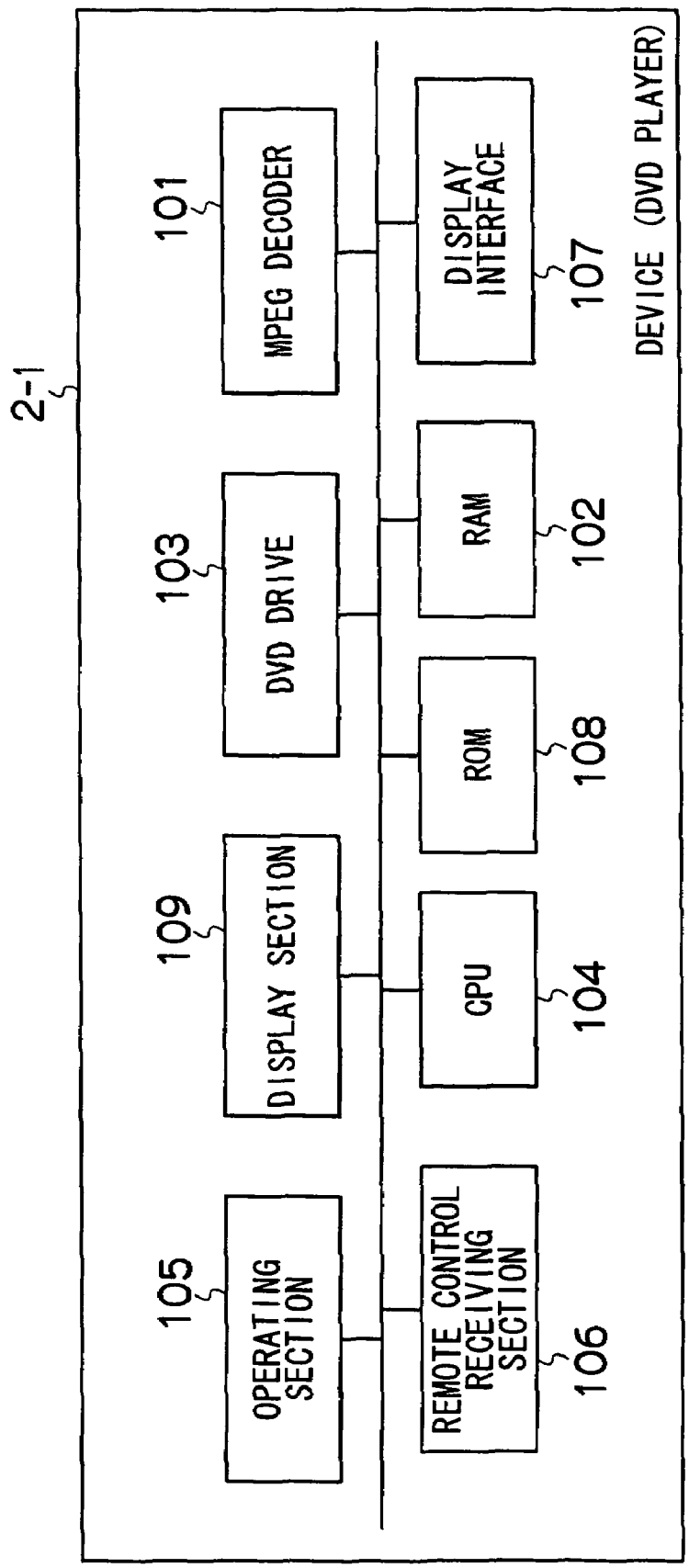
FIG. 11 is a block diagram of a DVD player which is an example of a device.

FIG. 11 is a block diagram which generally shows an overall configuration of the DVD player which is one type of device 2. The DVD player 2-1 of the present embodiment is a device which can reproduce a movie or music video, an associated main menu screen, and the like in accordance with a DVD-video standard. In addition, this video player has an OSD function which superimposes and displays an OSD such as a control bar for output volume or a control menu for various types of pictures on the main image or the like.

The DVD player 2-1 comprises a video and audio data processing system block having an MPEG decoder 101, a RAM 102, and a DVD drive 103. The DVD player 2-1 further comprises a CPU 104, an operating section 105, a remote control receiving section 106, a display interface 107, and a ROM 108.

The MPEG decoder 101 performs decoding processing and the like on DVD-video standard video and audio data read out by the DVD drive 103, and generates an RGB video signal for displaying an MPEG picture, a sub-picture, and a highlight, and an audio signal in PCM (Pulse Code Modulation) format.

When the MPEG decoder 101 receives an instruction to display OSD based on the control of the CPU 104, the MPEG decoder 101 performs decode processing or the like on OSD data stored in ROM 108 such as font data or compressed data of a control bar for output volume, a control menu for various types of pictures, or the like, and generates an RGB video signal for displaying the OSD.

After the MPEG decoder 101 generated the RGB video signal, MPEG decoder 101 converts the generated RGB video signal to a luminance signal and a color signal in a predetermined format, and outputs them to the display interface 107. As a result of this, various types of pictures such as an MPEG picture and an OSD is displayed on a display screen of a graphic display device connected to the DVD player 2-1 via the display interface 107.

The remote control receiving section 106 receives a remote control signal from the remote controller 1 and sends the signal to the CPU 104. The CPU 104 interprets a control content from the remote control signal, and controls each block such as the DVD drive 103 or the MPEG decoder 101 according to the control content.

Figure 12:
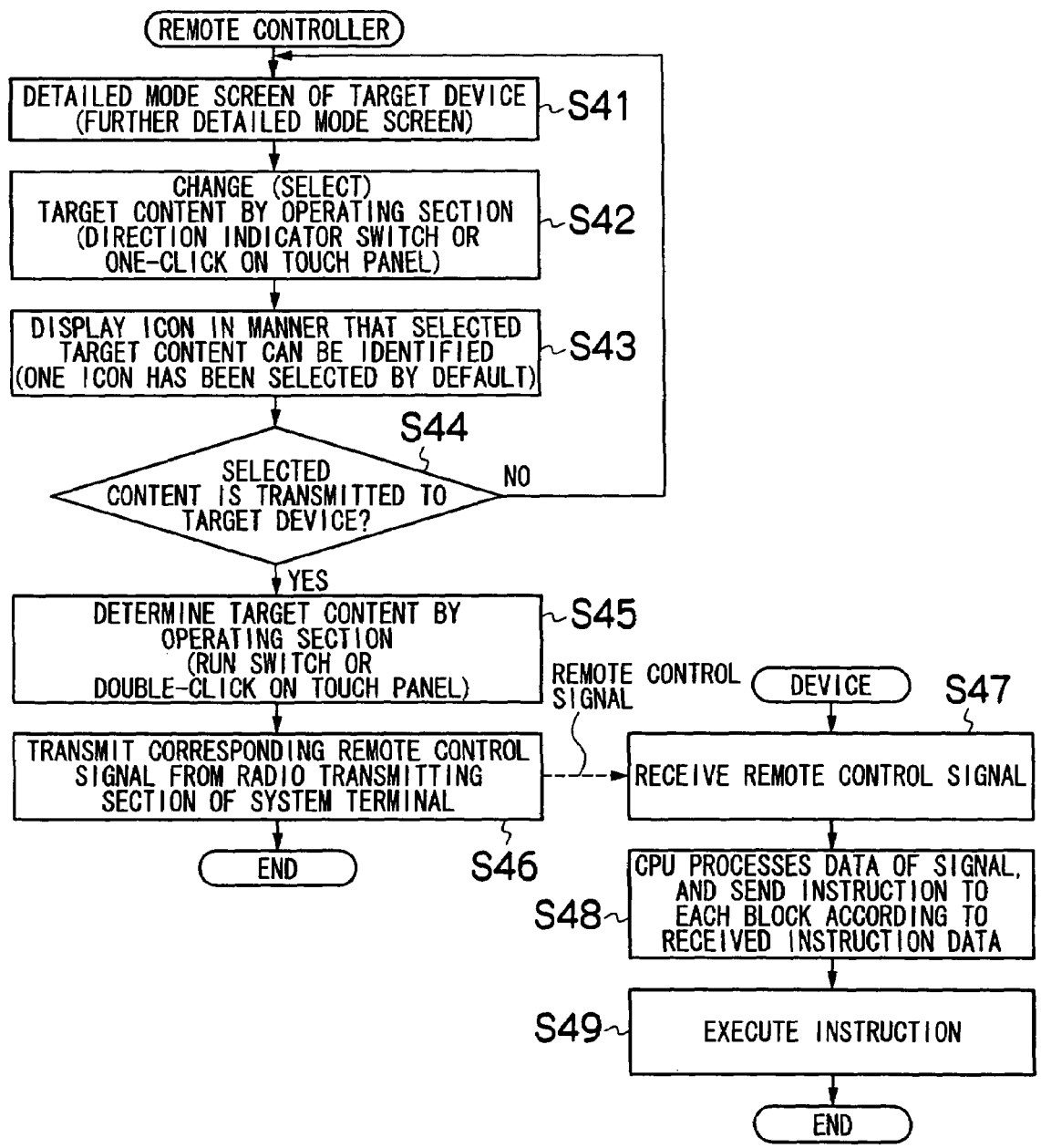
FIG. 12 is a flowchart which illustrates a flow of a remote control process according to the second embodiment.

FIG. 12 is a flowchart which illustrates a flow of a remote control process performed by the system of the present embodiment. S41 to S46 are performed by the remote controller 1, and S47 to S49 are performed by device 2. As an illustrative example, reproduction of a desired video content by a DVD player which is one type of device 2 is assumed and will be described here.

In S41, the remote controller 1 displays detailed information as in the above described S16 or S23.

In S42, the remote controller 1 selects a content to be reproduced according to an operation of the operating section 14.

In S43, the remote controller 1 highlights the selected content.

In S44, the remote controller 1 accepts an instruction to start reproduction of the selected content. The instruction to start reproduction is issued by pressing a "Run" switch which is additionally provided on condition that an item of content has been selected, double-clicking an item of content, or the like (see FIG. 10).

In S45, the remote controller 1 identifies a control code which reproduces the selected content.

In S46, the remote controller 1 transmits a remote control signal which defines the control code which reproduces the selected content to the device 2.

In S47, the device 2 receives the remote control signal from the remote controller 1 via the remote control receiving section 106.

In S48, the CPU 104 of the device 2 interprets the control code defined by the received remote control signal, and controls the MPEG decoder 101, the DVD drive 103, and the like according to a control content of the code. This allows a picture signal of the selected content to be generated.

In S49, the device 2 outputs the picture signal of the content selected at the remote controller 1 to the graphic display device via the display interface 107.

Additionally, this remote control based on detailed information may be applied to various types of devices other than a DVD player. For example, when the device 2 is a TV, a remote control signal which contains a control code that instructs a TV tuner to select a channel specified by detailed information of a currently broadcasting channel can be sent.

As described above, according to the present embodiment, since a remote control signal having a desired control content can be sent to a desired device 2 based on detailed information from the desired device 2, detailed remote control of a plurality of devices can be very easily performed using a single controller.

What is claimed is:

1. A remote controller, comprising:
    an acquisition section which continuously acquires, by an image pickup element, an image comprising a device to be remotely controlled, and device-specific information optically transmitted from the device, the device-specific information comprising detailed information about control of the device and a header identifying a hierarchy of the detailed information;
    a display section which superimposes the image and the device-specific information which are continuously acquired by the acquisition section to display the superimposed image and the device-specific information;
    an instruction accepting section which accepts, from a user, instructions of selection of the device-specific information to a desired device to be remotely controlled from among devices whose device-specific information is acquired and selection of a desired control content with respect to the desired device whose device-specific information is selected;
    a remote control section which transmits a remote control signal corresponding to the desired control content selected at the instruction accepting section to the desired device whose device-specific information is selected at the instruction accepting section; and
    a remote control signal control section which converts the device-specific information optically transmitted from the device to digital data, said digital data comprising converted information of the detailed information about control of the device and the header identifying the hierarchy of the detailed information,
    wherein the display section determines whether there is the hierarchy of the detailed information about control of the desired device whose device-specific information is selected based on the header according to a selection of the device-specific information at the instruction accepting section, and displays the detailed information for each hierarchical layer in the hierarchy according to a determination result of whether there is the hierarchy of the detailed information about control of the desired device,
    wherein the instruction accepting section accepts, from the user, instructions of selection of the desired control content with respect to the device whose device-specific information is selected from among the detailed information displayed for said each hierarchical layer in the hierarchy, and
    wherein the remote control section transmits the remote control signal corresponding to the desired control content selected from among the detailed information displayed for said each hierarchical layer in the hierarchy to the device whose device-specific information is selected at the instruction accepting section.

2. The remote controller according to claim 1, wherein the instruction accepting section accepts selection of desired detailed information from detailed information about control of the device displayed on the display section, and
    wherein the remote control section transmits a remote control signal corresponding to the desired control content defined by the detailed information selected at the instruction accepting section to the device whose device-specific information is selected at the instruction accepting section.

3. The remote controller according to claim 1, wherein the display section displays the detailed information about control of the selected device for said each hierarchical layer in the hierarchy.

4. The remote controller according to claim 2, wherein the display section displays the detailed information about control of the selected device for said each hierarchical layer in the hierarchy.

5. A remote control system, comprising:
    a device which optically transmits device-specific information and detailed information about control of the device;
    an acquisition section which continuously acquires, by an image pickup element, an image comprising the device, and the device-specific information optically transmitted from the device, the device-specific information, comprising the detailed information about control of the device and a header identifying a hierarchy of the detailed information;
    a display section which superimposes the image and the device-specific information which are continuously acquired by the acquisition section to display the superimposed image and the device-specific information;
    an instruction accepting section which accepts, from a user, instructions of selection of the device-specific information to a desired device to be remotely controlled from among devices whose device-specific information is acquired and selection of a desired control content with respect to the desired device whose device-specific information is selected;
    a remote control section which transmits a remote control signal corresponding to the desired control content selected at the instruction accepting section to the desired device whose device-specific information is selected at the instruction accepting section; and
    a remote control signal control section which converts the device-specific information optically transmitted from the device to digital data, said digital data comprising converted information of the detailed information about control of the device and the header identifying the hierarchy of the detailed information,
    wherein the display section determines whether there is the hierarchy of the detailed information about control of the desired device whose device-specific information is selected based on the header according to a selection of the device-specific information at the instruction accepting section, and displays the detailed information for each hierarchical layer in the hierarchy according to a determination result of whether there is the hierarchy of the detailed information about control of the desired device,
    wherein the instruction accepting section accepts, from the user, instructions of selection of the desired control content with respect to the desired device whose device-specific information is selected from among the detailed information displayed for said each hierarchical layer in the hierarchy, and wherein the remote control section transmits the remote control signal corresponding to the desired control content selected from among the detailed information displayed for said each hierarchical layer in the hierarchy to the device whose device-specific information is selected at the instruction accepting section.

6. A remote controlling method, comprising:

continuously acquiring, by an image pickup element, an image comprising a device to be remotely controlled, and device-specific information optically transmitted from the device, the device-specific information comprising detailed information about control of the device and a header identifying a hierarchy of the detailed information;

converting the device-specific information optically transmitted from the device to digital data, said digital data comprising converted information of the detailed information about control of the device and the header identifying the hierarchy of the detailed information;

accepting, from a user, an instruction of selection of the device-specific information to a desired device from among devices whose device-specific information is acquired;

determining whether there is the hierarchy of the detailed information about control of the desired device whose device-specific information is selected based on the header according to a selection of the device-specific information at an instruction accepting section, and displaying the detailed information for each hierarchical layer in the hierarchy according to a determination result of whether there is the hierarchy and the device-specific information;

accepting, from the user, instructions of selection of a desired control content with respect to the desired device whose device-specific information is selected from among the detailed information displayed for said each hierarchical layer; and transmitting a remote control signal corresponding to the desired control content selected from among the detailed information displayed for said each hierarchical layer in the hierarchy to the desired device whose device-specific information is selected at the instruction accepting section.

7. The remote controller according to claim 1, wherein the remote control section identifies detailed information of each of said devices.

8. The remote controller according to claim 1, wherein the remote control section performs a detailed remote control of said devices.

9. The remote controller according to claim 1, wherein the desired device whose device-specific information is selected allows the remote controller to identify the hierarchy of the detailed information by superimposing the header identifying the hierarchy of the detailed information.

10. The remote controller according to claim 1, wherein the device continuously transmits the device-specific information as an optical signal.

11. The remote controller according to claim 10, wherein the optical signal comprises an infrared signal.

12. The remote controller according to claim 1, wherein the detailed information about control of the device is optically transmitted from the device.

13. The remote controller according to claim 1, wherein the remote control section comprises an optical signal transmitting device comprising a light-emitting diode.

14. The remote controller according to claim 1, wherein the remote control signal control section transmits an optical signal, on which a control code and data indicated by the remote controller are superimposed, to the device.

15. The remote controller according to claim 14, wherein the control code comprises a speech code.

16. The remote controller according to claim 1, wherein the desired device identifies itself to the image pickup element by identifying a position from which the device-specific information is transmitted.

17. The remote controller according to claim 16, wherein the desired device superimposes at least one of an identification number, a serial number, a manufacturer number, a type number, and a model with a pilot signal indicating the position from which the device-specific information is transmitted, and continuously transmits the device-specific information as an optical signal to the acquisition section.

18. The remote control system according to claim 5, wherein the desired device identifies itself to the image pickup element by identifying a position from which the device-specific information is transmitted.

19. The remote control system according to claim 18, wherein the desired device superimposes at least one of an identification number, a serial number, a manufacturer number, a type number, and a model with a pilot signal indicating the position from which the device-specific information is transmitted, and continuously transmits the device-specific information as an optical signal to the acquisition section.

20. The method according to claim 6, wherein the desired device identifies itself to the image pickup element by identifying a position from which the device-specific information is transmitted, in which the desired device superimposes at least one of an identification number, a serial number, a manufacturer number, a type number, and a model with a pilot signal indicating the position from which the device-specific information is transmitted, and continuously transmits the device-specific information as an optical signal to the acquisition section.

* * * * *